US012395347B1

(12) United States Patent
Cronin et al.

(10) Patent No.: US 12,395,347 B1
(45) Date of Patent: Aug. 19, 2025

(54) KEYWORD SEARCH FOR AN ENCRYPTED MESSAGING SYSTEM

(71) Applicant: Cisco Technology, Inc., San Jose, CA (US)

(72) Inventors: Alan Cronin, Galway (IE); William Ward, Galway (IE); Declan Michael McAuley, Galway (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 263 days.

(21) Appl. No.: 18/153,006

(22) Filed: Jan. 11, 2023

(51) Int. Cl.
 *G06F 21/00* (2013.01)
 *H04L 9/06* (2006.01)
 *H04L 9/08* (2006.01)
 *H04L 9/32* (2006.01)

(52) U.S. Cl.
 CPC .......... *H04L 9/3242* (2013.01); *H04L 9/0618* (2013.01); *H04L 9/0894* (2013.01); *H04L 9/3297* (2013.01)

(58) Field of Classification Search
 CPC ................. H04L 9/3242; H04L 9/0618; H04L 9/0894; H04L 9/3297
 See application file for complete search history.

(56) References Cited

U.S. PATENT DOCUMENTS

| 10,095,885 | B1 | 10/2018 | Enderwick et al. |
| 11,386,101 | B2 | 7/2022 | Barnes, II |
| 11,595,202 | B1 * | 2/2023 | Stewart ............... H04L 9/50 |
| 2009/0300351 | A1 | 12/2009 | Lei et al. |
| 2010/0169321 | A1 | 7/2010 | Wang et al. |
| 2014/0156809 | A1 * | 6/2014 | Fu .................... H04L 67/06 709/219 |
| 2018/0248689 | A1 * | 8/2018 | Hu .................. H04L 9/0863 |
| 2020/0374120 | A1 * | 11/2020 | Stanley .............. H04L 9/0643 |
| 2021/0182408 | A1 | 6/2021 | Yeo et al. |

OTHER PUBLICATIONS

Zhao et al ("Multi-User Keyword Search Scheme for Secure Data Sharing with Fine-Grained Access Control" In: Kim, H. (eds) Information Security and Cryptology—ICISC 2011. ICISC 2011. Lecture Notes in Computer Science, vol. 7259. pp. 406-418. (Year: 2012).*

(Continued)

Primary Examiner — Michael M Lee
(74) Attorney, Agent, or Firm — Edell, Shapiro & Finnan, LLC (57) ABSTRACT

Techniques to index and search encrypted content are presented. A method includes assigning a unique encryption key to an organization (Org_Key) of which a user is a member, storing a first mapping of a user ID of the user to a resource ID of a resource, storing a second mapping of a first hash of the unique encryption key and the plaintext word to the resource ID, and storing a third mapping of a second hash of the Org_Key, the resource ID, and the plaintext word to a uniform resource locator link. A search for a given plaintext search word is performed by hashing the plaintext search word with the Org_Key to obtain the resource ID, and then hashing the plaintext search word, the resource ID and Org_Key, the result of which may map to a URL that points to the desired encrypted content.

20 Claims, 6 Drawing Sheets

(56) References Cited

OTHER PUBLICATIONS

Pham, et al., "Survey on Secure Search Over Encrypted Data on the Cloud," https://arxiv.org/abs/1811.09767, Nov. 24, 2018, 19 pages.
Cisco, "Webex Messaging Security," Cloud Collaboration Security Technical Paper, https://www.cisco.com/c/dam/en/us/td/docs/voice_ip_comm/cloudCollaboration/spark/esp/cisco-spark-security-white-paper.pdf, Dec. 2022, 28 pages.
Chen, Y,. et al, "Timestamped Conjunctive Keyword-Searchable Public Key Encryption," 2009 Fourth International Conference on Innovative Computing, Information and Control, IEEE Computer Society, https://dl.acm.org/doi/10.1109/ICICIC.2009.369, Dec. 7, 2009, 4 pages.

\* cited by examiner

KEYWORD SEARCH FOR AN ENCRYPTED MESSAGING SYSTEM

TECHNICAL FIELD

The present disclosure relates to keyword indexing and searching across resources in encrypted datastores.

BACKGROUND

Enterprise software or enterprise application software refers to computer software used by organizations such as offices, businesses, schools, etc., to provide a variety of services such as business-oriented tools, payment processing systems, billing systems, security, content management, information technology (IT), communication and collaboration support, etc. In many modern systems, aspects of the enterprise software may be executed by cloud-native environments. Such services, referred to as cloud-based services or cloud services, may be used for supporting electronic communication for an organization, e.g., in the form of text messages, e-mails, file transfers, transcribed meetings, etc.

In some systems, the cloud services may enable or support search functions for searching content, e.g., words. For example, a message history maintained by a cloud service can be searched for occurrences of one or more words or phrases. However, the cloud services may be provided by a third party, outside of a trusted network domain of the organization or individuals of the organization. Thus, for privacy and security concerns, the content stored by the cloud services for, e.g., electronic communications, may be encrypted to prevent direct access to underlying data by the cloud service provider (or others). However, such encryption places restrictions on the ability to support search functions for searching through the encrypted content.

DETAILED DESCRIPTION

Overview

Techniques to index and search encrypt content are presented. A method includes assigning a unique encryption key to an organization (Org_Key) of which a user is a member, storing a first mapping of a user ID of the user to a resource ID of a resource, wherein the resource is a computer application that processes a plaintext word on behalf of the user, storing a second mapping of a first hash of the unique encryption key and the plaintext word to the resource ID, and storing a third mapping of a second hash of the Org_Key, the resource ID, and the plaintext word to a uniform resource locator link. A search for a given plaintext search word is performed by hashing the plaintext search word with the Org_Key to obtain the resource ID, and then hashing the plaintext search word, the resource ID and Org_Key, the result of which may map to a URL that points to the desired encrypted content.

In another embodiment, a device is provided. The device includes an interface configured to enable network communications, a memory, and one or more processors coupled to the interface and the memory, and configured to: assign a unique encryption key to an organization of which a user is a member, store a first mapping of a user ID of the user to a resource ID of a resource, wherein the resource is a computer application that processes a plaintext word on behalf of the user, store a second mapping of a first hash of the unique encryption key and the plaintext word to the resource ID, and store a third mapping of a second hash of the unique encryption key, the resource ID, and the plaintext word to a uniform resource locator link.

Example Embodiments

Figure 1:
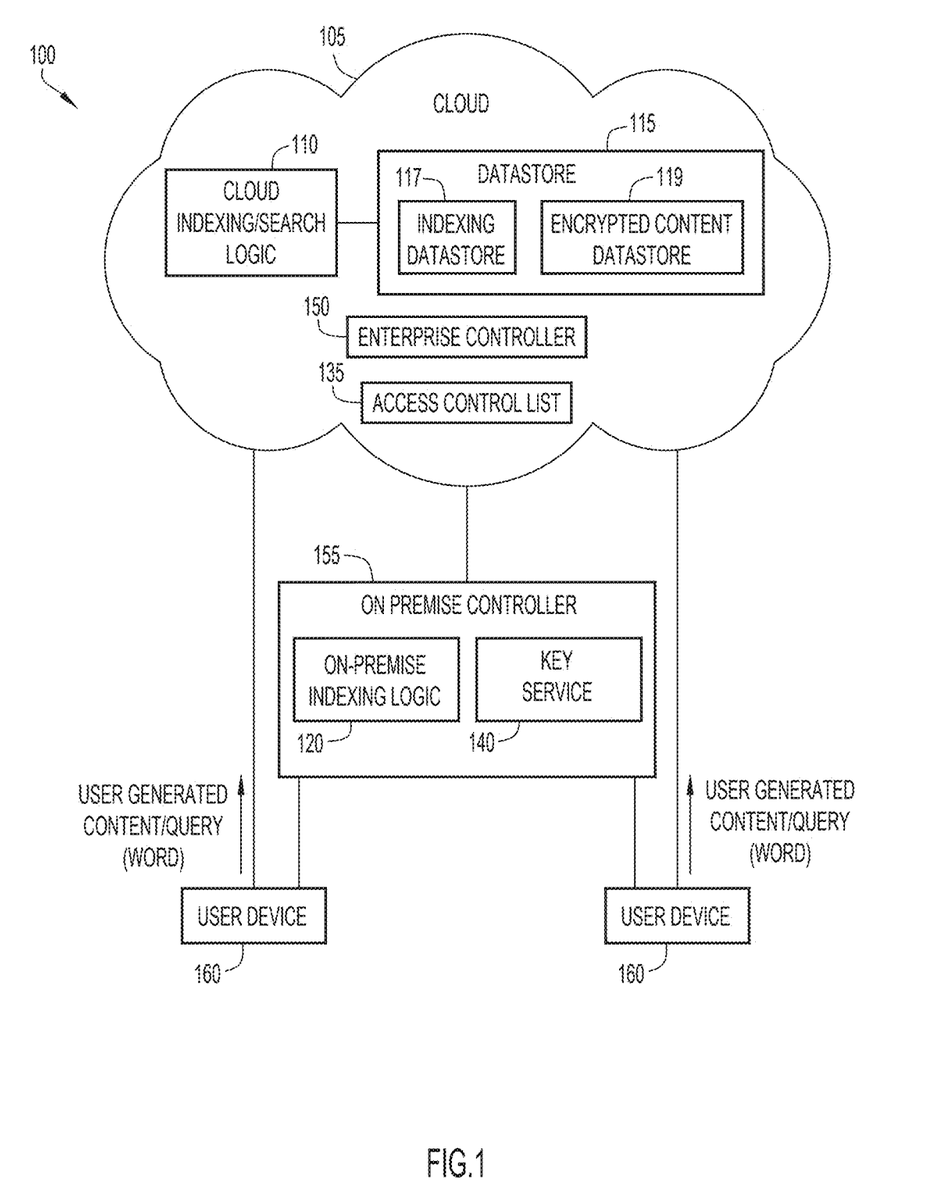
FIG. 1 shows a network topology including cloud indexing/search logic and a datastore in the cloud, an on premise controller including on-premise indexing logic and a key service, an access control list, an enterprise controller, and at least one user device, according to an example embodiment.

FIG. 1 shows a network topology 100 including cloud 105 hosting cloud indexing/search logic 110, a datastore 115 including indexing datastore 117 and encrypted content datastore 119, an access control list 135, and an enterprise controller 150. Also shown is an on-premise controller 155 including on-premise indexing logic 120 and a key service 140, and at least one user device 160, according to an example embodiment. As will be explained more fully below, the present embodiments are configured to serve a set of users (that respectively use a user device 160) in distinct organizations, where the users have access to "resources" containing dynamic user generated content. "Distinct organizations" may include different companies or even different groups within the same company. Users in those distinct groups may be managed by enterprise controller 150. In the context of the present disclosure, a "resource" may include an application such as text or instant messaging, email, and/or text derived, e.g., transcribed, from a video conference, or any other source. Each piece of additional content added to a resource is defined as an "activity" associated with that resource. Any user that can access the resource can continue to add activities to the resource. The full volume of content in a resource is represented as a stream of activities. It is noted that the resource described above is to be differentiated from, and not to be confused with, the use of the word "resource" in the context of a uniform resource location (URL), which is also used in connection with the methodology described herein.

Access control list 135 may be maintained, e.g., in coordination with enterprise controller 150 and is configured to enable/control user access to each resource, and/or to provide information regarding which resources a given user is authorized to access. A set of encryption keys provided by key service 140 is used to protect the content (e.g., stream of activities) generated by users using, e.g., symmetric encryption.

As will be explained in more detail below, an indexing methodology employs a cloud indexing service executed by cloud indexing/search logic 110, an on-premise indexing service executed by on-premise indexing logic 120 and a partitioned datastore, i.e., datastore 115, containing the original content (in encrypted form).

User generated content (and queries) are encrypted by user devices 160 using keys provided, e.g., by key service 140, so that plaintext content is not received or persisted by cloud 105, and more specifically, datastore 115.

The on-premise indexing logic 120 is configured to retrieve keys for the organization it represents and to decrypt content to index the content for search purposes. As shown, the on-premise indexing logic 120 is in communication with cloud indexing/search logic 110 using, e.g., a websocket. On-premise indexing logic 120 and cloud indexing/search logic 110 work together to index the user generated content and then store the same in datastore 115.

A content indexing process includes tokenizing text of activities into words, stemming words to their root word and filtering stop words, then generating a one-way hash of each tokenized word which is then stored in datastore 115.

The present embodiments provide, among other benefits, the ability to addresses the following search challenge. Given a plaintext search query entered by a user, the present embodiments provide a set of search results from datastore 115 that contain the most relevant activities that match the search query in the resources (email, text, transcripts, etc.) that the user is authorized to access without compromising the security of the system.

At a high level, the present embodiments provide a methodology that enables a full featured search that can search all indexed content types as well as searching in all resources that a user is part of. This makes encrypted search more beneficial to the users.

To implement such a methodology, the present embodiments capture data pertaining to the content (i.e., words of activities) being indexed, including:

Identifiers of keys used to generate one-way hashes of words (that are part of the content);
A mapping of users to resources; and
A mapping of words to resources.

In one implementation, the methodology does not store the encrypted content itself, but instead stores a reference URL that can be used to fetch the original content. This allows an added layer of security in case datastore 115 is attacked/compromised.

For each organization and partition in datastore 115 a unique key is created/assigned and is referred to as an "organization key" (or "OrgKey"), that is used to generate hash values of the words for content stored in a partition of datastore 115 that users in the organization are allowed to access (based, e.g., on access control list 135).

Indexing Flow

Figure 2:
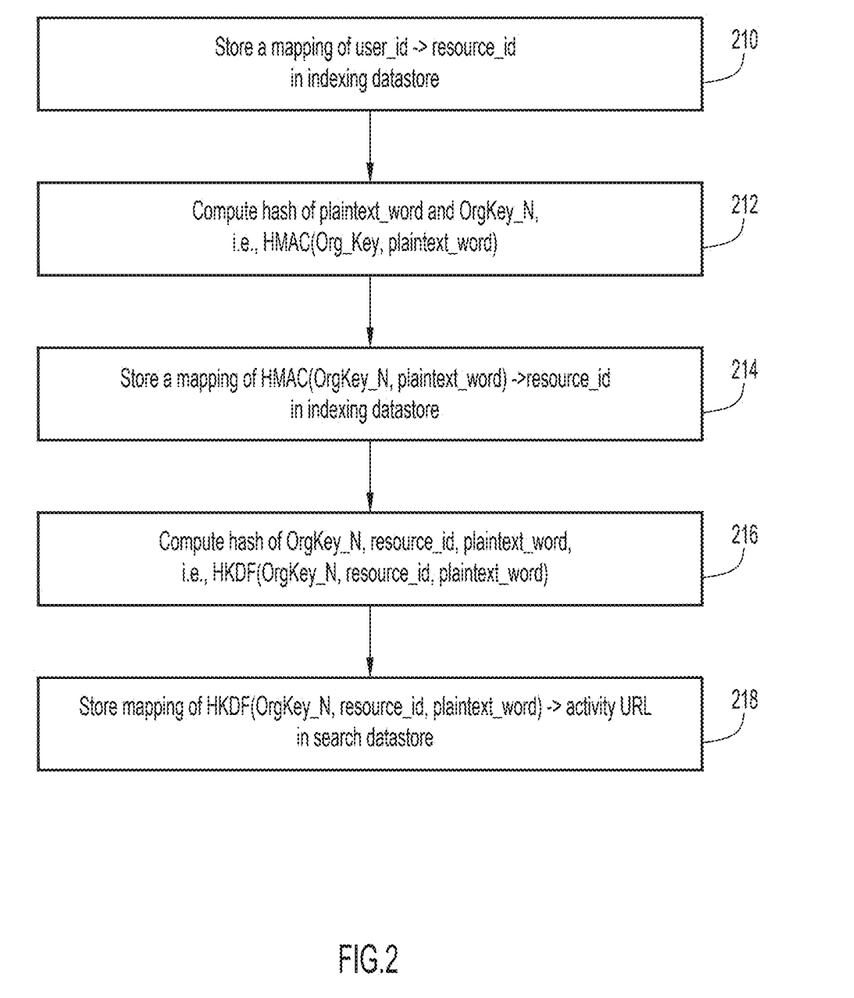
FIG. 2 shows a series of operations implemented to index content, according to an example embodiment.

Reference is now made to FIG. 2, which shows a series of operations implemented to index content (words), according to an example embodiment.

To index each activity (e.g., word), the methodology operates to store, e.g., in indexing datastore 117, the following information:

A mapping of user_id→resource_id in indexing datastore 117;
A mapping of a hash-based message authentication code HMAC(OrgKey_N, plaintext_word)→resource_id in the indexing datastore 117; and
A mapping of a HMAC key derivation function HKDF (OrgKey_N, resource_id, plaintext_word)→activity URL in the encrypted content datastore 119.

More specifically, as shown in FIG. 2, at 210, an operation stores a mapping of user_id to resource_id in indexing datastore 117. Each word to be indexed may first be tokenized, stemmed and/or filtered using a predetermined algorithm. This algorithm may include, e.g., removing stop words, e.g., those shorter than 3 characters, and determining the root words for each of the remaining entries. Then, at 212, an operation computes a hash of a given (tokenized, stemmed and/or filtered) plaintext_word and an OrgKey_N, i.e., HMAC(Org_Key, plaintext_word). At 214, an operation stores a mapping of HMAC(OrgKey_N, plaintext_word) to resource_id in indexing datastore 117. At 216, an operation computes a hash of OrgKey_N, resource_id, plaintext_word, i.e., HKDF(OrgKey_N, resource_id, plaintext_word). Then, at 218, an operation stores a mapping of HKDF (OrgKey_N, resource_id, plaintext_word) to an activity URL in encrypted content datastore 119.

In this way, the indexing datastore 117 and encrypted content datastore 119 are fully populated based on given content (plaintext_word), a given user_id, a given resource_id, and selected organization-specific keys used in connection with the noted hash operations.

Other information may also be stored in the indexing datastore 117. For example, indexing datastore 117 may also store:

1. a timestamp that a word was last added to a resource, perhaps with a timestamp granularity that obscures correlation with a particular activity;
2. an estimated number of occurrences of an OrgKey hashed word in a resource, perhaps recorded with the same granularity as the timestamp;
3. An estimated number of resources that an OrgKey hashed word appears in;
4. a timestamp that an activity was last added to a resource, perhaps with a timestamp granularity that obscures correlation with a particular activity;
5. a timestamp that authorization was last modified for a resource; and/or
6. An estimated number of activities associated with a resource.

As is explained in more detail later herein, this additional data may be employed to perform relevancy matching on a search request to identify a best result to be returned for the query from a particular user. Without at least some of this additional information, a user could end up with a large unordered list of results, and would be left to sort through the results on their own. By including at least some of the above indicated additional information, the search results can be ordered based on certain priority, such as resources that many users are part of, or that were updated recently, or resources with the highest number of word occurrences.

Search Flow

As shown in FIG. 1, not only are content (words) from user activities processed with on-premise indexing logic 120, but so are search queries sent by individual users via a respective user device 160. To perform a user content search in datastore 115, the following steps may be performed. The appropriate OrgKey_N is retrieved from, e.g., key service 140. The words in the search query are tokenized, stemmed and filtered using a same algorithm applied to words that were indexed. This process may include, as noted earlier, removing stop words such as those shorter than 3 characters, and determining the root words for each of the remaining entries, among other possible treatments.

Figure 3:
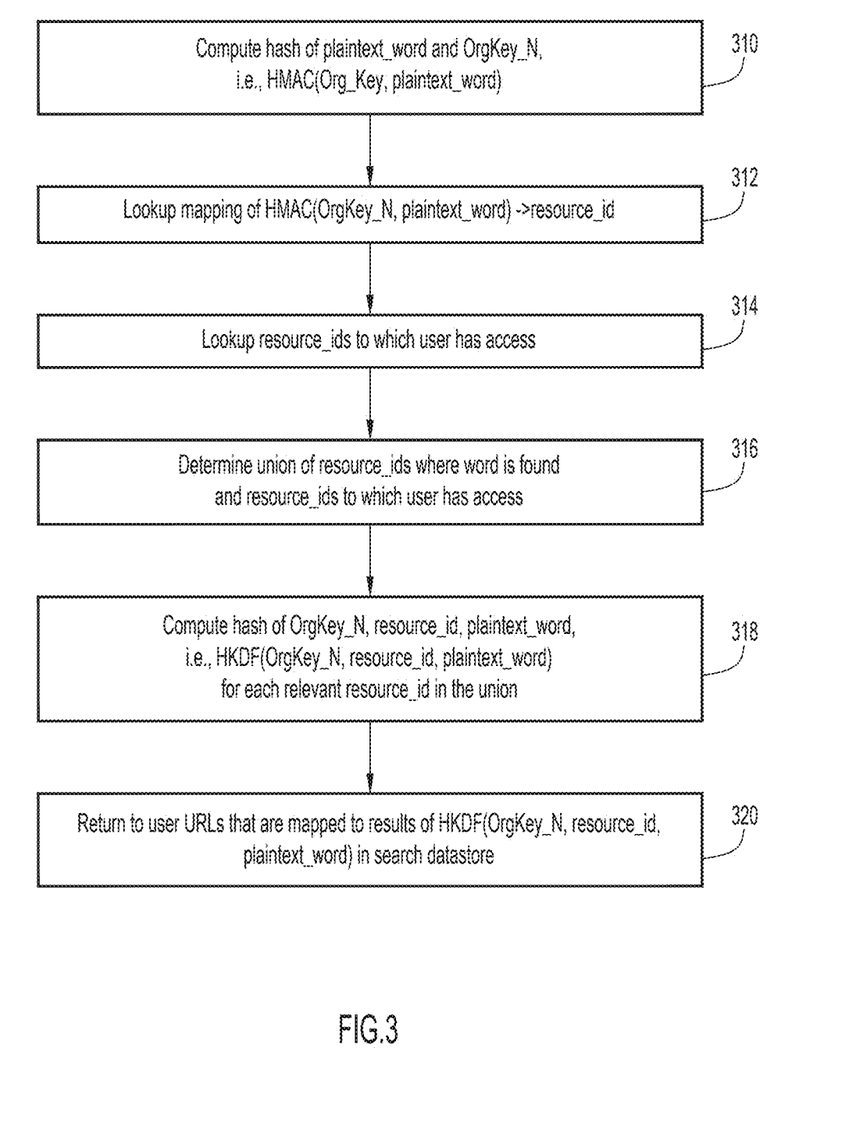
FIG. 3 shows a series of operations implemented to perform a user content search, according to an example embodiment.

Then, with reference to FIG. 3, which shows a series of operations implemented to perform a user content search, according to an example embodiment, at 310, a hash is computed or generated for each word in the search query and for each OrgKey using the function: HMAC(OrgKey_N, plaintext_word).

At 312, an operation includes looking up each resulting hash for a corresponding resource_id from the HMAC (OrgKey_N, plaintext_word) to resource_id mapping. In an embodiment, the resource_ids are ranked based on a word_resource relevancy score, described below.

At 314, an operation includes looking up the (list of) resources that the user has access to. Such a list may be gleaned from the mapping of user IDs to resources. The resulting resources may also be ranked using a user_resource relevancy score, described below.

At 316, an operation includes determining the union of the resource_ids where the searched word occurs and the resource_ids the user has access to. The resulting resource_ids may be ranked using a combination of the word_resource and user_resource relevancy scores.

At 318, an operation includes computing or generating a hash for the most relevant resource_ids to lookup in the encrypted content datastore 119. The hash is the same as that used in the indexing flow, namely: HKDF(OrgKey_N, resource_id, plaintext_word).

At 320, an operation includes returning to the user URLs from the encrypted content datastore 119 that match the hash HKDF(OrgKey_N, resource_id, plaintext_word).

Relevancy

The word_resource relevancy score may be calculated using:

Recency—the timestamp that a search word was last added to a resource;

Frequency—the number of occurrences of a search word in a resource; and

For a search query, a Term Frequency—Inverse Document Frequency (TF-IDF) score for each word in the query may be calculated as:

TF=word_occurrence_estimate from word to resource mapping

IDF=Log(number of resources the user is authorized for/number of resources the word occurs in)

TF-IDF=TF×IDF

The user_resource relevancy score may be calculated using:

Recency—the timestamp that an activity was last added to a resource (it is noted that a decay function may be used to build recency into the relevancy score, e.g., if a search result is 10% less valuable after 1 month, then a decay factor of 0.1 can be applied to the relevancy score for each month since the last occurrence of the word in the resource; and Scope—the number of people that have access to the resource.

To limit the risk of frequency analysis of the hashed word values, the methodology may limit the possibility for correlation between the data in the original data store and the meta data captured by the search service by using independent hashing functions in the data store and the search data store, resource_ids are only persisted in the data store, timestamp granularity is not precise preventing accurate identification of activities, and word counts are stored based on a time window granularity that limits the possibility for correlation with frequency tables.

Thus, those skilled in the art will appreciate that the embodiments described herein provide a mechanism to encrypt, and then search encrypted content using a meta data index that does not reveal the content of the encrypted data or allow an attacker to perform frequency analysis on the encrypted data.

Figure 4:
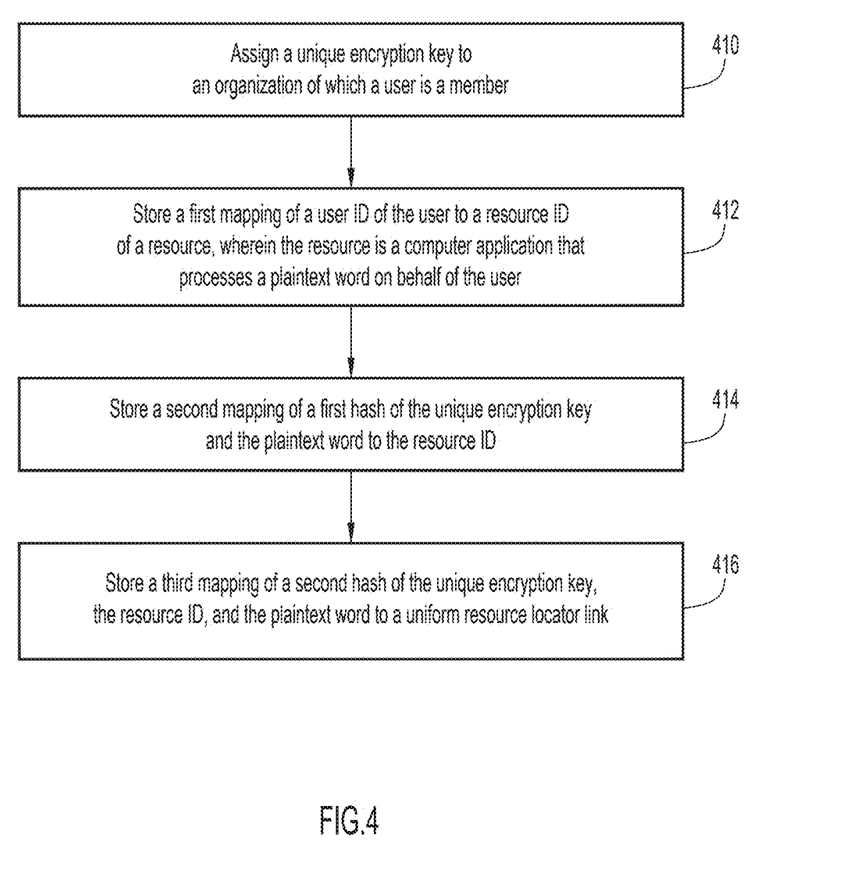
FIG. 4 shows another series of operations implemented to index content, according to an example embodiment.

FIG. 4 shows another series of operations implemented to index content, according to an example embodiment. At 410, an operation includes assigning a unique encryption key to an organization of which a user is a member. At 412, an operation includes storing a first mapping of a user ID of the user to a resource ID of a resource, wherein the resource is a computer application that processes a plaintext word on behalf of the user. At 414, an operation includes storing a second mapping of a first hash of the unique encryption key and the plaintext word to the resource ID. And, at 416, an operation includes storing a third mapping of a second hash of the unique encryption key, the resource ID, and the plaintext word to a uniform resource locator link.

Figure 5:
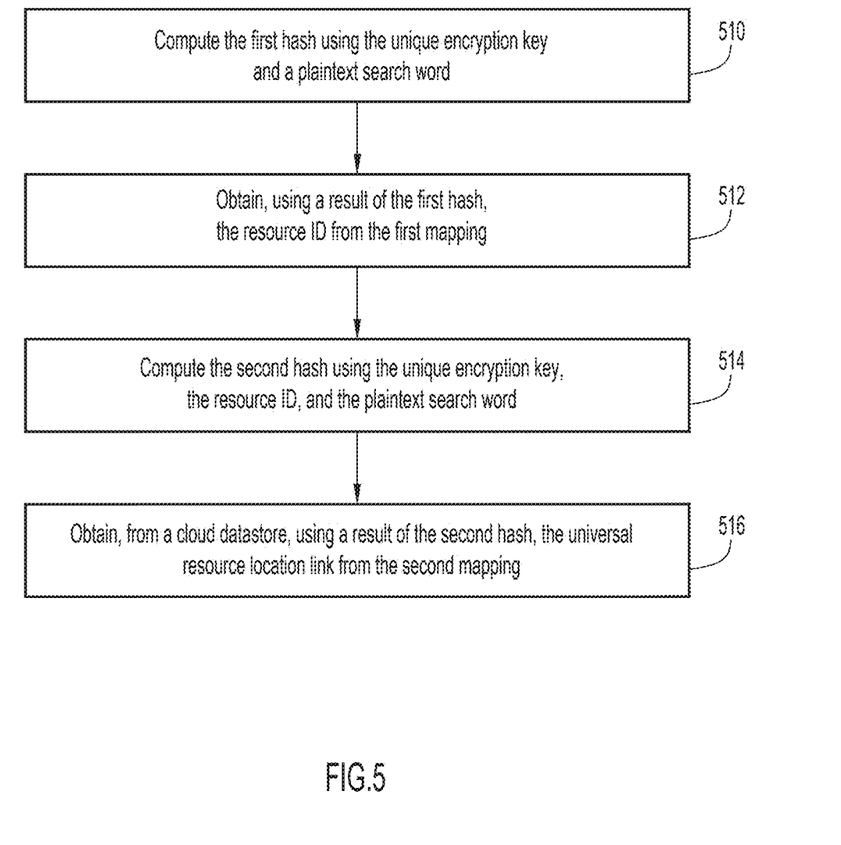
FIG. 5 shows another series of operations implemented to perform a user content search, according to an example embodiment.

FIG. 5 shows another series of operations implemented to perform a user content search, according to an example embodiment. At 510, an operation includes computing the first hash using the unique encryption key and a plaintext search word. At 512, an operation includes obtaining, using a result of the first hash, the resource ID from the first mapping. At 514, an operation includes computing the second hash using the unique encryption key, the resource ID, and the plaintext search word. And, at 516, an operation includes obtaining, from a cloud data store, using a result of the second hash, the universal resource location link from the second mapping.

Figure 6:
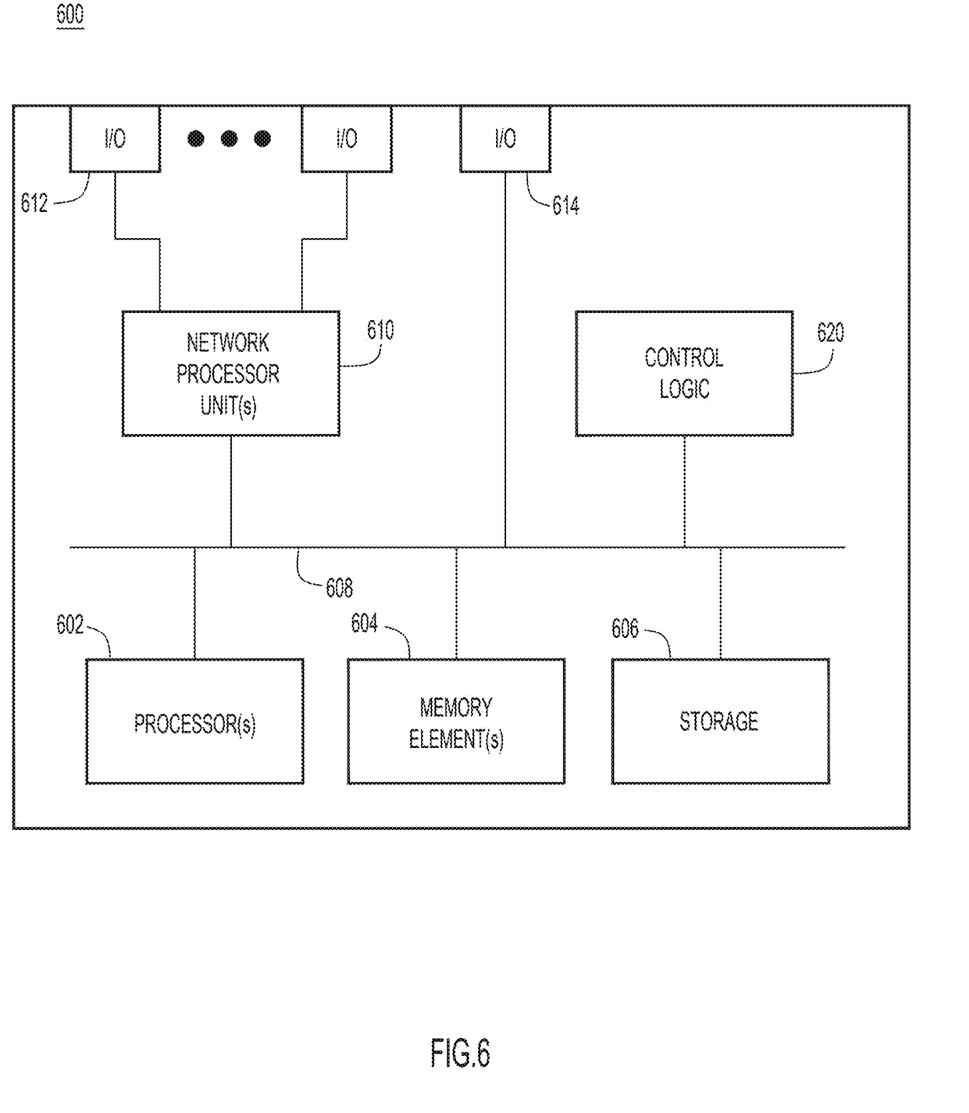
FIG. 6 is a block diagram of a computing device, server, etc., that may be configured as an enterprise controller and/or to host cloud indexing/search loc and perform the techniques described herein, according to an example embodiment.

FIG. 6 is a block diagram of a computing device, server, etc., that may be configured as an enterprise controller and its described functionality and/or to host cloud indexing/search logic 110 and perform the techniques described herein, according to an example embodiment.

In various embodiments, a computing device, such as computing device 600 or any combination of computing devices 600, may be configured as any entity/entities as discussed for the techniques depicted in connection with FIGS. 1-5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620 (which could include, for example, on-premise indexing logic 120 and/or cloud indexing/search logic 110). In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa) or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, in one embodiment a method is provided. The method may include assigning a unique encryption key to an organization of which a user is a member, storing a first mapping of a user ID of the user to a resource ID of a resource, wherein the resource is a computer application that processes a plaintext word on behalf of the user, storing a second mapping of a first hash of the unique encryption key and the plaintext word to the resource ID, and storing a third mapping of a second hash of the unique encryption key, the resource ID, and the plaintext word to a uniform resource locator link.

The method may further include storing the first mapping and the second mapping in an indexing datastore.

The method may also include storing the third mapping in an encrypted content datastore.

In the method, the resource is at least one of an email application, an instant message application, and a video conference application.

The method may also include storing along with the second mapping at least one of: a first timestamp that the plaintext word was last added to the resource, an estimated number of occurrences of the first hash in the resource, an estimated number of resources in which the first hash appears, a second timestamp that any plaintext word was last added to the resource, a third timestamp that authorization was last modified for the resource; and an estimated number of plaintext words associated with the resource.

The method may still also include adjusting a granularity of any of the first timestamp, the second timestamp, and the third timestamp, to obscure correlation with a predetermined activity.

The method may include conducting a search for the plaintext word by: computing the first hash using the unique encryption key and a plaintext search word, obtaining, using a result of the first hash, the resource ID from the first mapping, computing the second hash using the unique encryption key, the resource ID, and the plaintext search word, and obtaining, using a result of the second hash, the uniform resource locator link from the second mapping.

The method may include determining a union of a plurality of resources where the plaintext search word is found and a plurality of resource to which the user has access.

The method may include ranking the uniform resource locator link based on a relevancy score.

In the method, the relevancy score may be based on at least one of a word-resource relevancy score and a user-resource relevancy score.

A device may also be provided. The device may include an interface configured to enable network communications, a memory, and one or more processors coupled to the interface and the memory, and configured to: assign a unique encryption key to an organization of which a user is a member, store a first mapping of a user ID of the user to a resource ID of a resource, wherein the resource is a computer application that processes a plaintext word on behalf of the user, store a second mapping of a first hash of the unique encryption key and the plaintext word to the resource ID, and store a third mapping of a second hash of the unique encryption key, the resource ID, and the plaintext word to a uniform resource locator link.

In the device, the one or more processors may be further configured to store the first mapping and the second mapping in an indexing datastore.

In the device, the one or more processors may be further configured to store the third mapping in a search datastore.

In the device, the resource is at least one of an email application, an instant message application, and a video conference application.

In the device, the one or more processors may be further configured to store along with the second mapping at least one of: a first timestamp that the plaintext word was last added to the resource, an estimated number of occurrences of the first hash in the resource, an estimated number of resources in which the first hash appears, a second timestamp that any plaintext word was last added to the resource, a third timestamp that authorization was last modified for the resource, and an estimated number of plaintext words associated with the resource.

In the device, the one or more processors may be configured to adjust a granularity of any of the first timestamp, the second timestamp, and the third timestamp, to obscure correlation with a predetermined activity.

In the device, the one or more processors may be further configured to conduct a search for the plaintext word by: computing the first hash using the unique encryption key and a plaintext search word, obtaining, using a result of the first hash, the resource ID from the first mapping, computing the second hash using the unique encryption key, the resource ID, and the plaintext search word, and obtaining, using a result of the second hash, the uniform resource locator link from the second mapping.

In still another embodiment, there is provided one or more non-transitory computer readable storage media encoded with instructions that, when executed by a processor, cause the processor to: assign a unique encryption key to an organization of which a user is a member, store a first mapping of a user ID of the user to a resource ID of a resource, wherein the resource is a computer application that processes a plaintext word on behalf of the user, store a second mapping of a first hash of the unique encryption key and the plaintext word to the resource ID, and store a third mapping of a second hash of the unique encryption key, the resource ID, and the plaintext word to a uniform resource locator link.

The one or more non-transitory computer readable storage media may include instructions that are further configured to store along with the second mapping at least one of: a first timestamp that the plaintext word was last added to the resource, an estimated number of occurrences of the first hash in the resource, an estimated number of resources in which the first hash appears, a second timestamp that any plaintext word was last added to the resource, a third timestamp that authorization was last modified for the resource, and an estimated number of plaintext words associated with the resource.

The one or more non-transitory computer readable storage media may include instructions that are further configured to conduct a search for the plaintext word by: computing the first hash using the unique encryption key and a plaintext search word, obtaining, using a result of the first hash, the resource ID from the first mapping, computing the second hash using the unique encryption key, the resource ID, and the plaintext search word, and obtaining, using a result of the second hash, the uniform resource locator link from the second mapping.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method for generating an encrypted searchable datastore comprising:
   assigning a unique encryption key to an organization of which a user is a member;

storing a first mapping of a user ID of the user to a resource ID of a resource, wherein the resource is a computer application that processes a plaintext word on behalf of the user;

generating, using an electronic processor, a first hash based on the unique encryption key and the plaintext word;

storing a second mapping of the first hash to the resource ID;

generating, using the electronic processor, a second hash based on the unique encryption key, the resource ID, and the plaintext word;

storing a third mapping of the second hash to a uniform resource locator link;

receiving, from the user, an encrypted search request based on the plaintext word configured to query the encrypted searchable datastore; and in response to the encrypted search request, sending to the user the uniform resource locator link.

2. The method of claim 1, further comprising storing the first mapping and the second mapping in an indexing datastore of the encrypted searchable datastore.

3. The method of claim 1, further comprising storing the third mapping in a search datastore of the encrypted searchable datastore.

4. The method of claim 1, wherein the resource is at least one of an email application, an instant message application, and a video conference application.

5. The method of claim 1, further comprising storing along with the second mapping at least one of:
a first timestamp that the plaintext word was last added to the resource,
an estimated number of occurrences of the first hash in the resource,
an estimated number of resources in which the first hash appears,
a second timestamp that any plaintext word was last added to the resource,
a third timestamp that authorization was last modified for the resource; and
an estimated number of plaintext words associated with the resource.

6. The method of claim 5, further comprising adjusting a granularity of any of the first timestamp, the second timestamp, and the third timestamp, to obscure correlation with a predetermined activity.

7. The method of claim 1, further comprising conducting a search for the plaintext word by:
computing the first hash using the unique encryption key and a plaintext search word;
obtaining, using a result of the first hash, the resource ID from the first mapping;
computing the second hash using the unique encryption key, the resource ID, and the plaintext search word; and
obtaining, using a result of the second hash, the uniform resource locator link from the second mapping.

8. The method of claim 7, further comprising determining a union of a plurality of resources where the plaintext search word is found and a plurality of resources to which the user has access.

9. The method of claim 7, further comprising ranking the uniform resource locator link based on a relevancy score.

10. The method of claim 9, wherein the relevancy score is based on at least one of a word-resource relevancy score and a user-resource relevancy score.

11. A device for operating an encrypted searchable datastore comprising:
an interface configured to enable network communications;
a memory including instructions; and
one or more processors coupled to the interface and the memory, and configured to execute the instructions to:
assign a unique encryption key to an organization of which a user is a member;
store a first mapping of a user ID of the user to a resource ID of a resource, wherein the resource is a computer application that processes a plaintext word on behalf of the user;
generate, using the one or more processors, a first hash based on the unique encryption key and the plaintext word;
store a second mapping of the first hash to the resource ID;
generate, using the one or more processors, a second hash based on the unique encryption key, the resource ID, and the plaintext word;
store a third mapping of the second hash to a uniform resource locator link;
receive, from the user, an encrypted search request based on the plaintext word that is configured to query the encrypted searchable datastore; and
in response to the encrypted search request, send to the user the uniform resource locator link.

12. The device of claim 11, wherein the one or more processors are further configured to store the first mapping and the second mapping in an indexing datastore of the encrypted searchable datastore.

13. The device of claim 11, wherein the one or more processors are further configured to store the third mapping in a search datastore of the encrypted searchable datastore.

14. The device of claim 11, wherein the resource is at least one of an email application, an instant message application, and a video conference application.

15. The device of claim 11, wherein the one or more processors are further configured to store along with the second mapping at least one of:
a first timestamp that the plaintext word was last added to the resource,
an estimated number of occurrences of the first hash in the resource,
an estimated number of resources in which the first hash appears,
a second timestamp that any plaintext word was last added to the resource,
a third timestamp that authorization was last modified for the resource; and
an estimated number of plaintext words associated with the resource.

16. The device of claim 15, wherein the one or more processors are configured to adjust a granularity of any of the first timestamp, the second timestamp, and the third timestamp, to obscure correlation with a predetermined activity.

17. The device of claim 11, wherein the one or more processors are further configured to conduct a search for the plaintext word by:
computing the first hash using the unique encryption key and a plaintext search word;
obtaining, using a result of the first hash, the resource ID from the first mapping;
computing the second hash using the unique encryption key, the resource ID, and the plaintext search word; and obtaining, using a result of the second hash, the uniform resource locator link from the second mapping.

18. One or more non-transitory computer readable storage media encoded with instructions for operating an encrypted searchable datastore, the instructions when executed by a processor, cause the processor to:
assign a unique encryption key to an organization of which a user is a member;
store a first mapping of a user ID of the user to a resource ID of a resource, wherein the resource is a computer application that processes a plaintext word on behalf of the user;
store a second mapping of a first hash of the unique encryption key and the plaintext word to the resource ID;
store a third mapping of a second hash of the unique encryption key, the resource ID, and the plaintext word to a uniform resource locator link;
receive, from the user, an encrypted search request based on the plaintext word that is configured to query the encrypted searchable datastore; and
in response to the encrypted search request, send to the user the uniform resource locator link.

19. The one or more non-transitory computer readable storage media of claim 18, wherein the instructions are further configured to store along with the second mapping at least one of:

a first timestamp that the plaintext word was last added to the resource,
an estimated number of occurrences of the first hash in the resource,
an estimated number of resources in which the first hash appears,
a second timestamp that any plaintext word was last added to the resource,
a third timestamp that authorization was last modified for the resource; and
an estimated number of plaintext words associated with the resource.

20. The one or more non-transitory computer readable storage media of claim 18, wherein the instructions are further configured to conduct a search for the plaintext word by:
computing the first hash using the unique encryption key and a plaintext search word;
obtaining, using a result of the first hash, the resource ID from the first mapping;
computing the second hash using the unique encryption key, the resource ID, and the plaintext search word; and
obtaining, using a result of the second hash, the uniform resource locator link from the second mapping.

* * * * *